United States Patent [19]

Mochizuki et al.

[11] Patent Number: 4,696,740
[45] Date of Patent: Sep. 29, 1987

[54] UNIT TYPE WASTE WATER TREATING APPARATUS

[75] Inventors: Tadao Mochizuki, Kamagaya; Akira Nakajima, Sagamihara; Reizo Fukushima, Chigasaki, all of Japan

[73] Assignee: Kabushiki Kaisha Kyoritsu Yuki Kogyo Kenkyusho, Japan

[21] Appl. No.: 777,599

[22] Filed: Sep. 19, 1985

Related U.S. Application Data

[63] Continuation-in-part of Ser. No. 667,064, Nov. 1, 1984, abandoned, which is a continuation of Ser. No. 481,462, Apr. 1, 1983, abandoned.

[30] Foreign Application Priority Data

Apr. 7, 1982 [JP] Japan .................................. 57-56611

[51] Int. Cl.[4] .......................... C02F 1/74; C02F 3/22; B01D 21/02
[52] U.S. Cl. .................................. 210/151; 210/192; 210/221.2; 210/536; 261/77
[58] Field of Search ............... 210/150, 151, 197, 220, 210/221.2, 525, 526, 529, 616, 617, 615, 618, 620-626, 629, 532.1, 536; 261/77

[56] References Cited

U.S. PATENT DOCUMENTS

| | | | |
|---|---|---|---|
| 1,282,587 | 10/1918 | Jones | 210/220 |
| 3,206,032 | 9/1965 | Nottingham et al. | 210/629 X |
| 3,215,276 | 11/1967 | Lind et al. | 210/197 |
| 3,244,280 | 4/1966 | Lind et al. | 210/526 X |
| 3,681,200 | 8/1972 | Ridgway, Jr. | 261/77 X |
| 3,790,141 | 2/1974 | Champeau | 261/77 |
| 4,282,102 | 8/1981 | Rooney | 210/616 |

FOREIGN PATENT DOCUMENTS

| | | | |
|---|---|---|---|
| 146466 | 12/1978 | Japan | 210/616 |
| 154882 | 4/1983 | Japan . | |

*Primary Examiner*—Richard V. Fisher
*Assistant Examiner*—W. Gary Jones
*Attorney, Agent, or Firm*—Parkhurst & Oliff

[57] ABSTRACT

In apparatus for purifying waste water with activated sludge deposited on carrier particles, in which air is introduced into a treating tank for circulating the waste water and the carrier particles in the tank through an air lift, a separator is provided at an upper end of the tank for discharging purified water together with sludge peeled off from the particles thus leaving bared carrier particles in the tank for recirculation. A portion of the bottom of the tank is inclined to prevent precipitation of the activated carrier particles. The tank has a rectangular cross-sectional configuration to enable to arrange a number of tanks in a juxtaposed relation in series or parallel in a narrow floor space.

8 Claims, 8 Drawing Figures

UNIT TYPE WASTE WATER TREATING APPARATUS

CROSS-REFERENCE TO RELATED APPLICATION

This is a continuation-in-part application of Ser. No. 667,064 filed on Nov. 1, 1984, now abandoned, which is a continuation of Ser. No. 481,462 filed on Apr. 1, 1983, now abandoned.

BACKGROUND OF THE INVENTION

This invention relates to a compact apparatus for treating waste water with activated sludge coated on a carrier, and more particularly to a unit type treating apparatus that can be connected in series or parallel when increasing the capacity of the apparatus.

A method of treating waste water with activated sludge has been used widely and in such method and apparatus, attempts have been made to increase BOD (biological oxgyen demand) volume load. Thus, it has been proposed to deposit activated sludge on a carrier made up of particles of activated carbon, coke, calcium carbonate, etc. for the purpose of improving the efficiency of treating waste water. However, when the carrier particles are not satisfactorily coated with the activated sludge due to the flow of the particles in an aeration tank, the activated sludge peels off the particles, thus degrading the efficiency.

We have already invented an improved method and apparatus in which particles of coral are used as the carrier and have filed a Japanese patent application No. 154882/1981.

Although this method can efficiently purify contaminated waste water by coral particles acting as a carrier and coated with activated sludge, the loss of the carrier particles is large. In other words, when discharging purified water together with sludge peeled off from the carrier particles to the outside of a treating tank, a considerable quantity of the carrier particles is also discharged. Furthermore, as the treating tank was cylindrical, a large floor space was necessary where a number of treating tanks are juxtaposed for the purpose of increasing overall treating capacity. In addition, a considerable amount of the carrier particles tends to accumulate or precipitate on the bottom of the treating tank while the carrier particles are circulated through the tank together with the waste water. As a susbstantial quantity of the carrier particles accumulates, anaerobic bacteria grows, thereby promoting digestion.

SUMMARY OF THE INVENTION

Accordingly, it is an object of this invention to provide an improved unit type waste water treating apparatus capable of reducing the quantity of carrier particles discharged to the outside of the treating tank together with purified water.

Another object of this invention is to provide a unit type waste water treating apparatus so shaped that accumulation of the activated carrier particles at the bottom of the treating tank can be prevented and that a number of treating tanks can be juxtaposed in a small floor space for the purpose of increasing the overall capacity of the apparatus.

According to this invention there is provided a unit type waste water treating apparatus comprising a plurality of treating tanks disposed closely adjacent in series or parallel with each other, each tank having a rectangular cross-sectional configuration and loaded with a quantity of carrier particles; means for admitting air and waste water to be treated into the tank; vertical air lift means disposed in the tank, the carrier particles being covered by sludge contained in the waste water so as to form acitvated sludge, the air causing the carrier particles covered by the activated sludge to circulate in the tank through the air lift means together with the waste water, the air lift means comprising a reaction zone and remaining portion of the tank having substantially larger volume than the reaction zone forming a separation zone in which the activated sludge peels off from the carrier particles and floats upwardly; and at least one separator provided at an upper end of one side wall of the tank for discharging purified water and the sludge peeled off from the carrier particles, a bottom portion of the tank on which the carrier particles tend to precipitate being inclined at an angle sufficient to cause the carrier particles to gravitate toward the base of the tank, and the air admitting means being provided for the base at a location beneath the air lift means.

DESCRIPTION OF THE PREFERRED EMBODIMENTS

Figure 1:
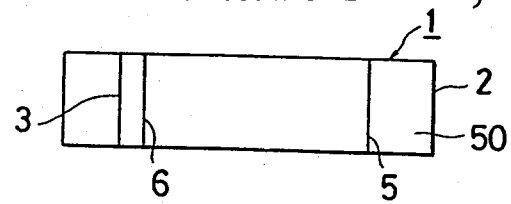
FIG. 1 is a plan view showing one emboidment of the unit type treating apparatus according to this invention.
Figure 2:
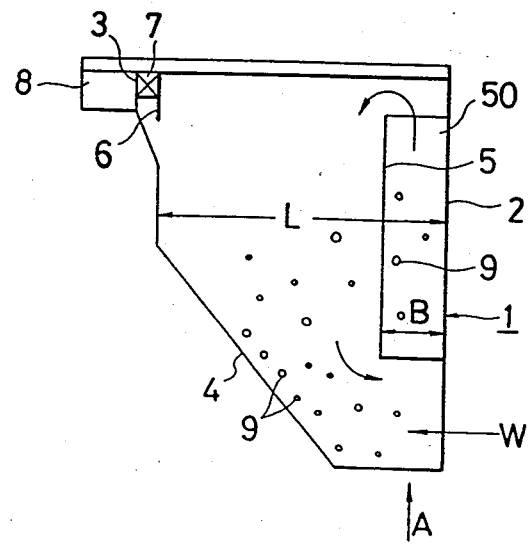
FIG. 2 is a longitudinal sectional view of the apparatus shown in FIG. 1.
Figure 3:
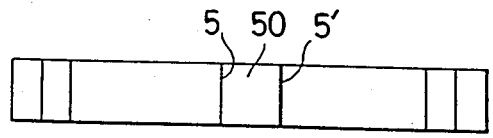
FIG. 3 is a plan view showing a modified embodiment of this invention.

The unit type treating apparatus of this invention shown in FIGS. 1 and 2 comprises a vertical treating tank 1 having a portion of bottom 4 inclined at an angle greater than 50°. Particles 9 of carrier (coral particles) coated with activated sludge are partially loaded in the tank 1. Waste water W to be treated or purified is admitted in the direction of an arrow near the bottom of the tank 1, while air A is admitted upwardly through the bottom of the tank as shown by an arrow. An air lift 50 is formed between one side wall 2 of the tank and a vertical partition wall 5. Thus, a mixture of the waste water and the carrier is blown upwardly through the air lift 50 by air A. After leaving the top end of the air lift, the mixture flows downwardly, thus circulating through the inside and outside of the air lift 50 as shown by arrows. The inclined bottom wall 4 assists the cirulatiion without causing the carrier particles to precipitate and accumulate on the bottom. While repeating circulation in this manner, the waste is always maintained in intimate contact with the carrier particles whereby the waste water is efficiently purified by the activated sludge. When the angle of inclination of the bottom 40 becomes less than 50°, a portion of the carrier particles accumulates or stays on the bottom. The anaerobic bacteria grows in the accumulated carrier particles, thus preventing digestion, or cleaning performance of aerobic bacteria.

Figure 5:
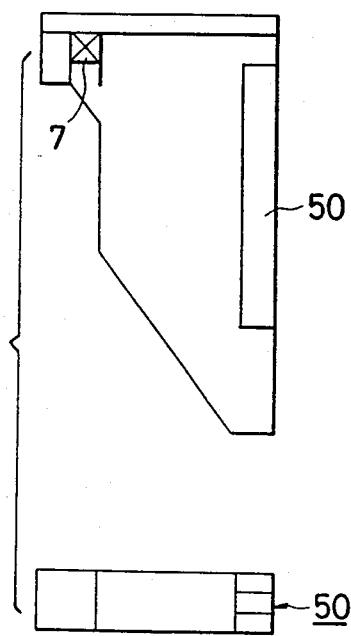
FIGS. 5 and 6 are front views showing different examples of the air lift.
Figure 6:
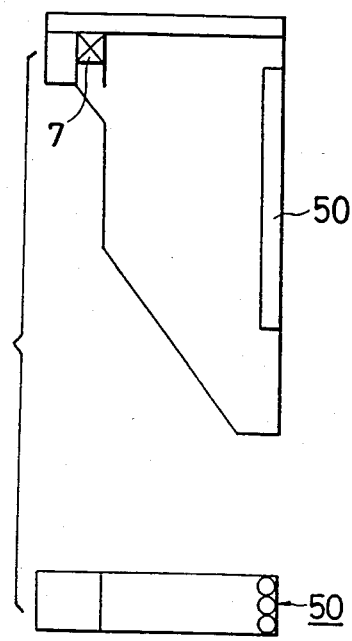

Although the position of the partition wall 5 varies depending upon the quantity of waste water, the quantity of air, the BOD load and the BOD concentration of the waste water and stay time, it is preferable that the spacing B between the vertical side wall 2 and the partition wall 5, that is the position thereof, is selected to satisfy the following relation.

$$\tfrac{1}{2}L \geq B > 0$$

where L represents the horizontal length of the tank 1. The air lift 50 may have the same width as that of the tank as shown in FIG. 1 or may be divided into a plurality of sections as shown in FIG. 5. Further, the air lift 50 may be constituted by a plurality of circular parallel sections as shown in FIG. 6. With the same quantity of air, where the air lift 50 is divided into a plurality of sections, the air lift effect can be enhanced because the air rises in narrow sections in a highly concentrated manner without diffusion.

About 10% by volume based on the volume of the treating tank of the carrier particles is loaded in the tank. The quantity of air introduced is determined by larger one of the BOD of the waste water to be treated and the quantity necessary to fluidize the carrier particles in the air lift 50. The waste water to be treated may be admitted into the treating tank from the upper portion or lower portion thereof.

A short partition wall 6 is provided near the upper end 3 of the inclined wall 4 to permit treated waste water to overflow into a treated water reservoir 8. A separator 7, which may be constituted by separated inclined plates, is provided between the upper end 3 and the partition wall 6 for separating the sludge which has been peeled off the carrier particles. More particularly, purified water and peeled off sludge enter into the reservoir 8 through the gaps between inclined plates, leaving bared carrier particles in the tank. Such bared carrier particles will soon be activiated by the sludge contained in the waste water while circulating through the treating tank. The plates are secured to a common adjusting shaft so that when the shaft is rotated during operation to bring the plate upright, the gaps between the plates become maximum. Under this state, area of precipitation is zero. On the other hand, when the shaft is rotated to incline the plates the area of precipitation, and resistance to flow increase. Although any separator other than inclined plates may be used, inclined plates are preferred because by changing the angle of inclination of the plates, the degree of separation can be adjusted which is necessary for different quantities of the waste water and sludge.

We designate the zone including the air lift 5 as a reaction zone and the zone to the left of the air lift 5 as a separation or sedimentation zone. As can be noted from the drawings, the volume of the separation zone is considerably larger than that of the reaction zone. While rising through the air lift, aerobic bacteria grows about the surface of the carrier particles so as to form activated sludge which purifies waste water. While repeatedly circulating through the reaction zone and the separation zone, the films of grown bacteria, that is the activated sludge peel off from the carrier particles. Since the volume of the separation zone is large, water speed slows down so that peeled off films of the activated sludge float upwardly and are discharged to the outside together with cleaned water through separator 7. The bared carrier particles drop to the bottom of the tank along sloped side to start a new cycle of purification.

A treating apparatus of this invention having a volume of 1 to 20 m$^3$ (for example, horizontal length of 2m width of 1m and height of 4–5m) is the easiest to operate. A treating tank having a smaller volume than this is troublesome to operate.

Figure 4:
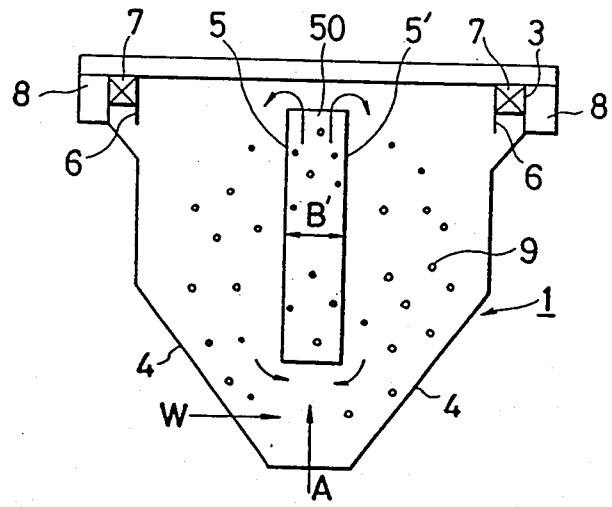
FIG. 4 is a longitudinal sectional view of the apparatus shown in FIG. 3.
Figure 7:
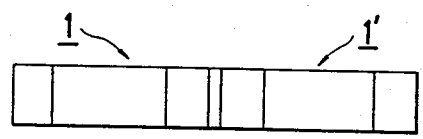
FIGS. 7 and 8 are plan views showing manners of adding the unit type treating apparatus in series or parallel.
Figure 8:
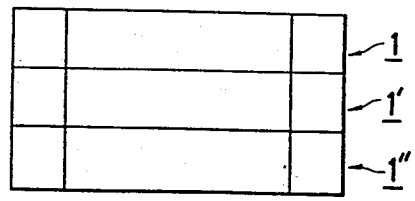

According to this invention the tank is shaped to have a rectangular sectional configuration. With this construction, as the quantity of waste water increases, two or more units can conveniently be provided to operate in series or parallel as shown in FIGS. 7 and 8. Instead of juxtaposing two tanks in the horizontal direction as shown in FIG. 7, two tanks may be combined into a single tank as shown in FIG. 4 in which a common air lift 50 is disposed at the center of the tank 1 and defined by two spaced vertical partition walls 5 and 5'. In this modified construction, the spacing B' between the two partition walls may be B'=2B, or $\tfrac{1}{2}L \geq B'/2 > 0$. In FIG. 4, as shown by arrows, the mixture of the waste water and carrier particles flows in opposite directions on both sides of the air lift 50, but in the same direction in the air lift. The interior of the air lift 50 can be divided into a plurality of sections in the same manner as in FIGS. 5 and 6.

The treating tank may be made of steel or concrete, but the latter is preferred because of its low cost. With a given volume of the tank, the quantity of air varies depending upon the type of and quantity of the waste water. When the air lift 50 is designed by taking into consideration these factors the waste water can be treated economically. As the unit treating tank has a rectangular cross-sectional configuration it is easy to install a number of units side by side relation, thus saving the floor space.

The following Table I shows physical characteristics of the tank embodying the invention and of a control example, and Table II shows the result of treatment obtained by using the treating tank of this invention and a control tank.

TABLE I

|  | Dimension | Capacity | Area of precipitation | Variable precipitation area of separator | Shape |
|---|---|---|---|---|---|
| This invention | 0.7 m × 0.3 m × 5 mH 2 air lift tubes each 0.1 m dia. | 1 m$^3$ | 0.15 m$^2$ | (6 inclined plates, each 0.1 m × 0.2 m) | Same as FIG. 5 |
| Control example | 0.5 m dia. × 5.5 mH one air lift pipe of 0.3 m dia. | 1 m$^3$ | 0.13 m$^2$ | no | Air lift pipe at the center of cylinder |

TABLE II

| | Flow rate m³/day | Waste water BOD ppm | Air quantity m³min. | Flowout quantity of g/day | BOD of treated water (after separation by natural precipitation) ppm |
|---|---|---|---|---|---|
| This invention | 25 | 210 | 0.4 | 5 | less than 9 |
| Control example | 25 | 210 | 0.5 | 300 | less than 9 |

Table II shows that according to this invention not only the air quantity can be reduced but also the loss of the carrier can be greatly reduced.

What is claimed is:

1. A unit type waste water treating apparatus having a variable treatment capacity, said apparatus comprising:
    a plurality of identical treatment tanks communicating in series or parallel with each other, the capacity of said apparatus increasing as the number of tanks in said plurality of tanks increases;
    each tank having a rectangular cross-sectional configuration defined by four side walls, one side wall of one tank of said plurality of tanks disposed closely adjacent to a side wall of an adjacent tank of said plurality of tanks, and each tank being loaded with a quantity of carrier particles separated from the carrier particles in an adjacent tank by said side walls;
    means for admitting air and waste water to be treated into each tank;
    vertical air lift means disposed in each tank;
    said carrier particles being covered by sludge contained in said waste water so as to form activated sludge;
    said air causing said carrier particles covered by said activated sludge to circulate in each tank through said air lift means together with said waste water;
    said air lift means in each tank comprising a reaction zone and a remaining portion of each tank having substantially larger volume than said reaction zone forming a separation zone in which said activated sludge peels off from said carrier particles and floats upwardly, said reaction zone having a width B expressed by a relation $$\tfrac{1}{8}L \geq B > 0$$

wherein L represents a horizontal length of the tank; and
    at least one separator provided at an upper end of one side wall of each tank for discharging, by overflow, purified water and the sludge peeled off from said carrier particles, said separator comprising a plurality of spaced inclined plates;
    a bottom portion of each tank on which said carrier particles tend to precipitate being inclined at an angle sufficient to cause said carrier particles to gravitate toward the base of said tank; and
    said air admitting means being provided for said base at a location beneath said air lift means.

2. The apparatus according to claim 1 wherein said bottom portion is inclined at an angle larger than 50°.

3. The apparatus according to claim 1 wherein said air lift means is divided into a plurality of sections extending in the vertical direction.

4. The apparatus according to claim 1 wherein said air lift means comprises a plurality of parallel pipes extending in the vertical direction.

5. The apparatus according to claim 1 wherein said air lift means is constituted by one side wall of said tank opposite to said separator and a partition wall parallel to said one side wall and space therefrom a predetermined distance.

6. The apparatus according to claim 1 wherein said air lift means is disposed at the central portion of said tank and constituted by two parallel spaced apart partition walls.

7. The apparataus according to claim 6 wherein portions of the bottom of said tank on the opposite sides of said air lift means are inclined upwardly.

8. The aparatus according length of about 2m, a width of about 1m and a height of 4–5m.

* * * * *